2,710,848

POLYMERIC LINEAR TEREPHTHALATES DISSOLVED IN A SOLVENT COMPRISING TRIFLUOROACETIC ACID

Sterling S. Sweet, Maurice H. Van Horn and Philip T. Newsome, Rochester, N. Y., assignors to Eastman Kodak Company, Rochester, N. Y., a corporation of New Jersey No Drawing. Application June 25, 1953,
Serial No. 364,197

4 Claims. (Cl. 260—31.2)

This invention relates to new compositions of matter containing highly polymeric polymethylene terephthalates dissolved in trifluoroacetic acid; and to the manufacture of synthetic filaments, yarns, sheets, films and other shaped articles therefrom by dry spinning, or other suitable evaporative processes, wherein the solvent is expelled from the shaped article by controlled heated atmospheres, or by contact with a heated surface.

The synthetic polyester component of our new solution composition is highly polymeric linear polymethylene terephthalates with recurring structural units of the general formula:

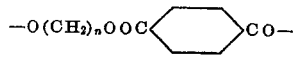

wherein $n$ is an integer from 2 to 10.

These synthetic polyester compositions may be prepared by heating glycols of the series $HO(CH_2)_nOH$ wherein $n$ is an integer within the range of 2 to 10 with terephthalic acid or with an ester forming derivative thereof as is described in United States Patent 2,465,319 of March 22, 1949.

The polymethylene glycols having from 2 to 10 methylene groups which may be employed include ethylene glycol, trimethylene glycol, tetramethylene glycol, pentamethylene glycol, hexamethylene glycol, heptamethyene gycol, octamethylene glycol, nonamethylene glycol and decamethylene glycol. It is preferable to employ glycols having 2 to 4 methylene groups since they produce highly polymerized esters with very high melting points and of these glycols, ethylene glycol $HO(CH_2)_2OH$ is favored because of its availability. Mixtures of these glycols can also be employed, if desired.

Suitable ester forming derivatives of terephthalic acid are aliphatic or aromatic esters such as methyl, ethyl, propyl, butyl, amyl, hexyl, and heptyl terephthalates and aryl esters such as those from penol and cresol.

It is well known that these polymers are very slightly or not at all soluble in common low boiling solvents such as acetone, benzene, etc., and that those solvents which are available, such as nitrobenzene, orthochlorophenol, cresylic acid, and mixtures of tetrachloroethane and phenol are high boiling liquids which are difficult to remove after spinning or coating from solvent solutions. Furthermore, the removal of these solvents usually requires such a high temperature that crystallization and embrittlement may occur so as to prevent the cold drawing or rolling of the material. The present invention, however, permits the production of shaped polyesters which have high strength and dimensional and chemical stability.

An object, therefore, of the present invention is to provide a new composition of matter containing a highly polymeric polymethylene terephthalate dissolved in trifluoracetic acid.

Another object of the invention is to provide a spinning solution containing highly polymeric polymethylene terephthalate in trifluoracetic acid solvent.

Still another object is to provide a film or sheet containing a highly polymeric polymethylene terephthalate and trifluoracetic acid.

Other objects of the invention are to provide processes for producing filaments, yarn, sheets and film from solutions containing highly polymeric polymethylene terephthalate dissolved in trifluoroacetic acid.

Other objects will appear hereinafter.

We have found, in accordance with our invention, that the linear polyesters which have recurring structural units of the general formula:

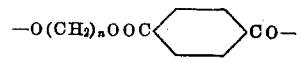

wherein $n$ is an integer from 2 to 10 are soluble in trifluoracetic acid. The use of trifluoroacetic acid as the solvent makes practical the preparation of clear solutions containing as high as 33 grams of polyester to 100 grams of solvent. These solutions can be coated on a moving heated surface to form films of sufficient strength and ductility to permit rolling and stretching. These solutions can also be forced through spinnerets by a suitable dry spinning process and formed into filaments and yarns which can be drawn to result in strong filaments. Our invention, therefore, makes available all the advantages of coating and spinning from solvents to the process of these previously intractable polymers.

The present invention is further illustrated in the following examples:

Example 1

Twenty grams of a high viscosity polyethylene terephthalate were dissolved in 60 grams of trifluoroacetic acid (B. P. 72° C.) at room temperature (20° C.) in an Erlenmeyer flask. Solution is complete in 2–3 hours but may be accelerated by warming at 70° C. for one hour. A clear, practically colorless solution was obtained which was coated on a glass or metal plate. After overcuring at 70° C. for 16 hours, a clear film 0.005 inch thick was obtained and was found to have the following physical properties:

| | |
|---|---|
| M. I. T. folds | 905 |
| Research tear | 200 |
| Tensile strength p. s. i. | 4500 |
| Elongation per cent | 50 |

The term "research tear" in this table refers to a test commonly employed in paper testing. The machine for making this test is made by the Thwing Albert Instrument Co.

Example 2

Twenty-five grams of a high viscosity polyethylene terephthalate (intrinsic viscosity 0.90) were dissolved in 75 grams of trifluoroacetic acid at 70° C., solution was complete in one hour. A clear, viscous dope was obtained which was then filtered and spun into air at room temperature, i. e. approximately 20° C. through a spinneret under 50 pounds pressure. The resulting filaments were stretched 300%, with a consequent increase in tensile strength from 10,000 to 45,000 pounds per square inch.

This invention, it will be seen, permits polyethylene terephthalate and its related compounds mentioned herein to be formed by more or less conventional spinning and coating processes into shaped articles. Heretofore the preparation of films and fibers of these polyesters has been impractical except by melt extrusion. Spinning and coating from solvent solutions generally results in more uniformity than is obtainable by melt spinning or coating methods.

We have also found that dichloroacetic acid is a solvent for such above mentioned highly polymeric polymethylene terephthalates. However, for some uses this solvent is held too tenaciously by these polymers so that drying or curing the article formed from such solutions is rather difficult and hence we prefer to employ trifluoroacetic acid as the solvent in such cases.

We claim:

1. A new composition of matter comprising a highly polymeric linear terephthalate composed of recurring structural units of the general formula:

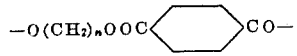

wherein $n$ is an integer from 2 to 10 dissolved in a solvent comprising trifluoracetic acid.

2. A new spinning solution from which filaments and fibers may be dry spun comprising from 5 to 25% by weight a highly polymeric linear terephthalate composed of recurring structural units of the general formula:

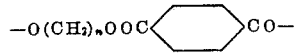

wherein $n$ is an integer from 2 to 10 dissolved in a solvent comprising trifluoracetic acid.

3. A new composition of matter consisting of polyethylene terephthalate dissolved in trifluoracetic acid.

4. A new solution from which filaments and film may be formed consisting of 5 to 25% of polyethylene terephthalate dissolved in trifluoracetic acid.

References Cited in the file of this patent

UNITED STATES PATENTS 2,497,376     Swallow _____ Feb. 14, 1950

FOREIGN PATENTS 630,992     Great Britain _____ Oct. 25, 1949